US012285953B2

(12) United States Patent
Shim et al.

(10) Patent No.: US 12,285,953 B2
(45) Date of Patent: Apr. 29, 2025

(54) INKJET PRINTER GAS PRESSURE CONTROLLER PROVIDED WITH NEGATIVE PRESSURE TEST LINE, INKJET PRINTER INCLUDING GAS PRESSURE CONTROLLER, AND METHOD OF TESTING NEGATIVE PRESSURE IN INKJET PRINTER

(71) Applicant: GOSANTECH CO., LTD., Cheonan-si (KR)

(72) Inventors: Ji Hoon Shim, Cheonan-si (KR); Yi Kyu Park, Cheonan-si (KR)

(73) Assignee: GOSANTECH CO., LTD., Cheonan-si (KR)

( * ) Notice: Subject to any disclaimer, the term of this patent is extended or adjusted under 35 U.S.C. 154(b) by 140 days.

(21) Appl. No.: 18/338,792

(22) Filed: Jun. 21, 2023

(65) Prior Publication Data

US 2024/0190138 A1 Jun. 13, 2024

(30) Foreign Application Priority Data

Dec. 7, 2022 (KR) ........................ 10-2022-0169821

(51) Int. Cl.
*B41J 2/175* (2006.01)

(52) U.S. Cl.
CPC ................................ *B41J 2/17596* (2013.01)

(58) Field of Classification Search
CPC ........... B41J 2/175; B41J 2/19; B41J 2/17596
See application file for complete search history.

(56) References Cited

U.S. PATENT DOCUMENTS 9,227,420 B1 * 1/2016 Nakamura ................. B41J 2/18
10,029,474 B2 * 7/2018 Takada ............... B01D 19/0073
(Continued)

FOREIGN PATENT DOCUMENTS

JP 2022-24188 A 2/2022
KR 10-2092018 B1 3/2020
(Continued)

OTHER PUBLICATIONS

Decision on Registration for Korean Patent Application No. 10-2022-0169821 dated Sep. 12, 2024 issued by Korean Intellectual Property Office (KIPO).

*Primary Examiner* — An H Do
(74) *Attorney, Agent, or Firm* — Sughrue Mion, PLLC

(57) ABSTRACT

An inkjet printer gas pressure controller provided with a negative pressure test line, an inkjet printer including the gas pressure controller, and a method of testing negative pressure in the inkjet printer are proposed. The gas pressure controller having the negative pressure test line for controlling gas pressure includes a negative pressure generation unit capable of suctioning air and applying negative pressure through an output tube, a positive pressure generation unit capable of exhausting the air and applying positive pressure through the output tube, a negative pressure test line capable of testing the negative pressure generated by the negative pressure generation unit when connected to the negative pressure generation unit, and a pressure control module for controlling the negative pressure or positive pressure to be applied through the output tube by controlling a connection relationship between the negative pressure generation unit, the positive pressure generation unit, and the output tube.

10 Claims, 8 Drawing Sheets

(56) References Cited

U.S. PATENT DOCUMENTS 11,135,853 B1 * 10/2021 Yu .............................. B41J 2/18
11,654,691 B2 * 5/2023 Park ........................... B41J 2/20
347/89

FOREIGN PATENT DOCUMENTS

KR 10-2021-0087731 A 7/2021
KR 10-2490968 B1 1/2023

* cited by examiner

INKJET PRINTER GAS PRESSURE CONTROLLER PROVIDED WITH NEGATIVE PRESSURE TEST LINE, INKJET PRINTER INCLUDING GAS PRESSURE CONTROLLER, AND METHOD OF TESTING NEGATIVE PRESSURE IN INKJET PRINTER

CROSS REFERENCE TO RELATED APPLICATION

The present application claims priority to Korean Patent Application No. 10-2022-0169821, filed Dec. 7, 2022, the entire contents of which is incorporated herein for all purposes by this reference.

BACKGROUND OF THE INVENTION

Field of the Invention

The present disclosure relates to a gas pressure controller for maintaining a meniscus state of stored ink in an inkjet printer and, more particularly, to a gas pressure controller provided with a negative pressure test line capable of testing negative pressure generated in the gas pressure controller, to an inkjet printer including the gas pressure controller, and to a method of testing the negative pressure in the inkjet printer.

The present disclosure was made by a task (Task title: Inkjet Head Module Performance Evaluation for High-Resolution Display Mass Production) carried out with support of “Mass Production Performance Evaluation Support Project” conducted by the Korea Institute for Advancement of Technology on the basis of support from the Ministry of Trade, Industry and Energy under Project No. P0021692.

Description of the Related Art

Currently, in industrial fields, devices for discharging liquid are widely used for various purposes. For example, liquid is discharged to a desired location to form a pattern for the purpose of drawing a specific shape such as an electric circuit, liquid is also discharged thinly in order to produce thin fibers, and in order to coat a surface, liquid may also be discharged onto the surface to be coated of an object.

An inkjet method for spraying liquid-state ink in a form of droplets on a medium surface according to a shape signal is used not only for printing documents or flyers but also performing solution processes in the fields of semiconductors or displays.

The scope of application in which inkjet printing may form complex shapes of patterns on a substrate or ink may be accurately discharged only at a specific location is extending farther. A small inkjet printer for document creation has a structure of storing ink in an inkjet head for discharging ink droplets, whereas a large printer for document creation or an inkjet printer built for industrial use applies a structure in which a storage unit for storing ink and an inkjet head are separated from each other due to use of a large amount of ink.

In addition, in order to discharge an accurate amount of ink in a process of inkjet printing, the ink that is in a discharge-ready state in an inkjet head should be maintained in a meniscus state, i.e., a curved surface state in which the ink is indented inward with respect to a nozzle inlet by a capillary phenomenon. To this end, it is common that an ink storage unit for supplying the ink to the inkjet head is positioned higher than the inkjet head, and by way of compensation, a gas pressure controller suctions air filled inside the ink storage unit, so as to generate negative pressure in the ink storage unit, thereby enabling the inkjet head to prevent the ink from flowing down and maintain the meniscus state capable of discharging the fixed amount of ink.

When such a gas pressure controller fails to maintain the meniscus state generated for the inkjet head through the ink storage unit, the precision of inkjet printing becomes low or contamination occurs due to ink leaking from a nozzle of the inkjet head, so such a problem causes disruption of the inkjet printing and may end up causing downtime of the entire production facility.

Accordingly, it is critical to maintain a state of generating negative pressure in a gas pressure controller, and in order to prevent a problem due to sudden failure, inspection for the gas pressure controller is performed at a cycle shorter than lifespans of parts used in the gas pressure controller. However, since an inkjet printer is unable to be used in the process of performing the inspection of the gas pressure controller, frequent inspection becomes a cause of decreasing production efficiency and increasing production cost.

In order to solve such problems, techniques for easily testing a negative pressure state of a gas pressure controller are being developed, but due to characteristics of the gas pressure controller operating in an inkjet printer for most of the time, it is common that the inkjet printer is unable to be used during the process of testing.

Korean Patent No. 10-2092018 discloses a device developed for measuring negative pressure applied to an inkjet head on the basis of an image of chemical liquid formation at a nozzle photographed by a chemical liquid formation-capturing camera installed on an inkjet head-side. Such a device has a strong point of being able to measure the negative pressure applied to the inkjet head without stopping an inkjet printer. However, as a technology to increase the control precision of the gas pressure controller by accurately measuring the negative pressure applied to the inkjet head, the device is difficult to be applied for the purpose of evaluating in advance whether a gas pressure controller has failed or not, so the technology is unable to solve the problem that arises in a process of troubleshooting for the gas pressure controller.

DOCUMENTS OF RELATED ART (Patent Document 1) Korean Patent No. 10-2092018

SUMMARY OF THE INVENTION

The present disclosure is to solve the problems of the related art described above. An objective of the present disclosure is to provide a gas pressure controller capable of performing continuous testing for negative pressure of the gas pressure controller during the process of using an inkjet printer without interrupting the operation of the inkjet printer, and is to provide a method of testing the negative pressure by using the gas pressure controller and to provide the inkjet printer including the gas pressure controller.

According to the present disclosure for achieving the above objective, there is provided an inkjet printer gas pressure controller provided with a negative pressure test line, the gas pressure controller controlling gas pressure in an inkjet printer and including: a negative pressure generation unit capable of suctioning air and applying negative pressure through an output tube; a positive pressure generation unit capable of exhausting the air and applying positive pressure through the output tube; the negative pressure test line capable of testing the negative pressure generated by the negative pressure generation unit when connected to the negative pressure generation unit; and a pressure control module for controlling the negative pressure or positive pressure to be applied through the output tube by controlling a connection relationship between the negative pressure generation unit, the positive pressure generation unit, and the output tube, wherein the pressure control module operates to connect the negative pressure generation unit and the negative pressure test line to each other when connecting the positive pressure generation unit and the output tube to each other in order to apply the positive pressure through the output tube.

The negative pressure generation unit may operate for a predetermined time or more when the pressure control module connects the positive pressure generation unit and the output tube to each other in order to apply the positive pressure through the output tube, and the negative pressure generated by the negative pressure generation unit is tested in the negative pressure test line connected to the negative pressure generation unit.

The negative pressure test line may measure the negative pressure generated by the negative pressure generation unit and compare the measured negative pressure with normal negative pressure for a control voltage applied to the negative pressure generation unit during measurement.

According to another form of the present disclosure, there is provided an inkjet printer including a gas pressure controller provided with a negative pressure test line, the inkjet printer including: an inkjet head provided with a nozzle for discharging ink; an ink storage unit configured to store the ink to supply the ink to the inkjet head; and the gas pressure controller connected to the ink storage unit and configured to control internal pressure so that the ink stored in the ink storage unit maintains a meniscus state in the inkjet head, wherein the gas pressure controller may include: a negative pressure generation unit capable of suctioning air and applying negative pressure through an output tube; a positive pressure generation unit capable of exhausting the air and applying positive pressure through the output tube; the negative pressure test line capable of testing the negative pressure generated by the negative pressure generation unit when connected to the negative pressure generation unit; and a pressure control module for controlling the negative pressure or positive pressure to be applied through the output tube by controlling a connection relationship between the negative pressure generation unit, the positive pressure generation unit, and the output tube, and the pressure control module may operate to connect the negative pressure generation unit and the negative pressure test line to each other when connecting the positive pressure generation unit and the output tube to each other in order to apply the positive pressure through the output tube.

The negative pressure generation unit may operate for a predetermined time or more when the pressure control module connects the positive pressure generation unit and the output tube to each other in order to apply the positive pressure through the output tube, and the negative pressure generated by the negative pressure generation unit may be tested in the negative pressure test line connected to the negative pressure generation unit.

The negative pressure test line may measure the negative pressure generated by the negative pressure generation unit and compare the measured negative pressure with normal negative pressure for a control voltage applied to the negative pressure generation unit during measurement.

According to a yet another form of the present disclosure, there is provided a method of testing negative pressure in an inkjet printer, the method including: testing the negative pressure of a gas pressure controller in the inkjet printer including an inkjet head provided with a nozzle for discharging ink, an ink storage unit configured to store the ink to supply the ink to the inkjet head, and the gas pressure controller connected to the ink storage unit and configured to control internal pressure so that the ink stored in the ink storage unit maintains a meniscus state in the inkjet head, wherein the gas pressure controller may include: a negative pressure generation unit capable of suctioning air and applying the negative pressure through an output tube; a positive pressure generation unit capable of exhausting the air and applying positive pressure through the output tube; a negative pressure test line capable of testing the negative pressure generated by the negative pressure generation unit when connected to the negative pressure generation unit; and a pressure control module for controlling the negative pressure or positive pressure to be applied through the output tube by controlling a connection relationship between the negative pressure generation unit, the positive pressure generation unit, and the output tube, and the pressure control module may operate to connect the negative pressure generation unit and the negative pressure test line to each other when connecting the positive pressure generation unit and the output tube to each other in order to apply the positive pressure through the output tube, and perform a negative pressure test through the negative pressure test line connected to the negative pressure generation unit in a state where the gas pressure controller applies the positive pressure to the ink storage unit in a process of using the inkjet printer.

The negative pressure test line may measure the negative pressure generated by the negative pressure generation unit and compare the measured negative pressure with normal negative pressure for a control voltage applied to the negative pressure generation unit during measurement.

The negative pressure test line may determine whether an intake valve operates normally or not by comparing an increased amount in the negative pressure in a state where an exhaust valve of the negative pressure generation unit is operated.

The negative pressure test line may determine whether an exhaust valve operates normally or not by comparing a decreased amount in the negative pressure in a state where an intake valve of the negative pressure generation unit is operated.

The present disclosure configured as described above provides an effect that a pressure switching module for controlling the connection relationship between the output tube and the negative pressure generation unit or positive pressure generation unit in the gas pressure controller connects the negative pressure generation unit to the negative pressure test line when the positive pressure generation unit is opened, whereby the negative pressure test may be performed whenever positive pressure is applied in the gas pressure controller of the inkjet printer.

In addition, since the negative pressure test may be performed whenever the gas pressure controller of the inkjet printer applies positive pressure, there is an effect that the negative pressure test may be performed in the middle of using the inkjet printer without interrupting the operation of the inkjet printer separately for the negative pressure test of the gas pressure controller.

Furthermore, there are great effects that not only there is no problem of increase in production cost incurred by the interruption of the operation of the inkjet printer because the operation of the inkjet printer is not interrupted separately for the negative pressure test of the gas pressure controller, but also damage caused by sudden failure of the gas pressure controller may be prevented by way of preventing the failure of the gas pressure controller in advance because the negative pressure test is frequently performed with a very short cycle compared to the lifespans of parts used in the gas pressure controller.

DETAILED DESCRIPTION OF THE INVENTION

Figure 1:
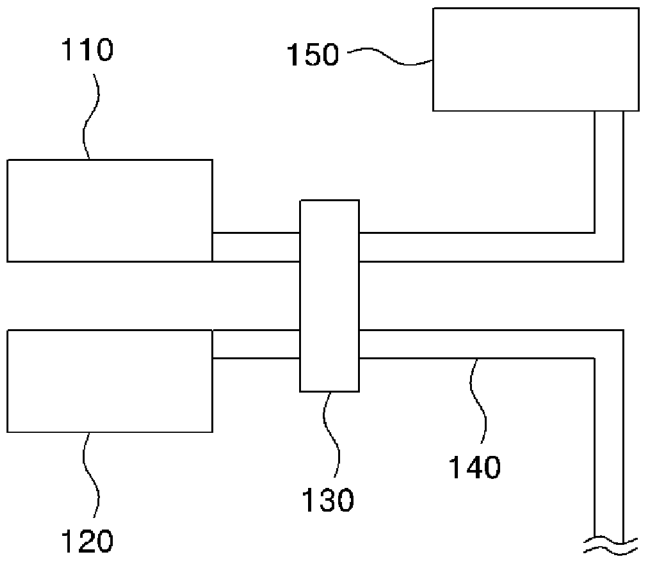
FIG. 1 is a view illustrating a configuration of an inkjet printer gas pressure controller provided with a negative pressure test line according to an exemplary embodiment of the present disclosure.

Exemplary embodiments according to the present disclosure will be described in detail with reference to the accompanying drawings.

However, an embodiment form of the present disclosure can be modified in many different forms, and the scope of the present disclosure is not limited only to the embodiment form described below. The shapes and sizes of elements in the drawings may be exaggerated for clearer description, and elements indicated by the same reference numerals in the drawings are the same elements.

In addition, throughout the specification, when a part is said to be “connected” to another part, an expression such as “connected” is intended to include not only “directly connected” but also “electrically connected”, while having a different element in the middle thereof. In addition, when a part is said to “include” or “comprise” a certain component, it means that it may further include or comprise another component, except to exclude another component unless the context clearly indicates otherwise.

In addition, terms such as “first”, “second”, and the like are used to distinguish one component from another, so the scope of rights should not be limited by these terms. For example, a first component may be referred to as a second component, and similarly, the second component may also be referred to as the first component.

Figure 2:
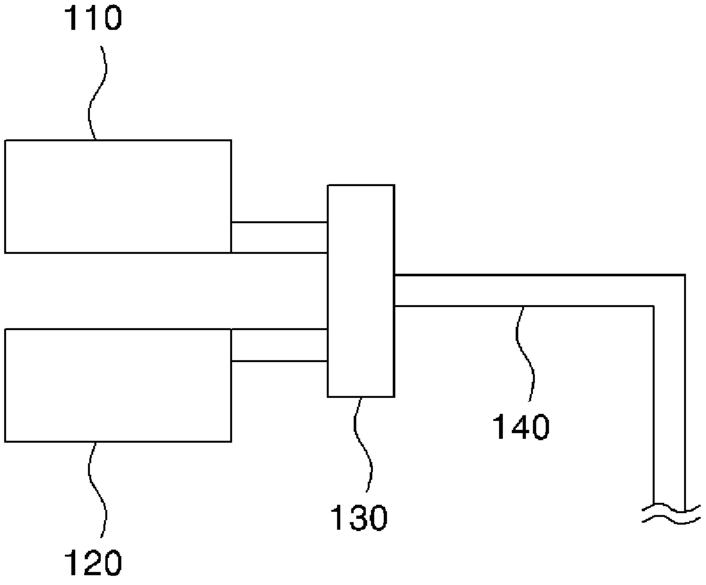
FIG. 2 is a view illustrating a configuration of a generally used conventional inkjet printer gas pressure controller.

FIG. 1 is a view illustrating a configuration of an inkjet printer gas pressure controller provided with a negative pressure test line according to an exemplary embodiment of the present disclosure, and FIG. 2 is a view illustrating a configuration of a generally used conventional inkjet printer gas pressure controller.

The inkjet printer gas pressure controller provided with the negative pressure test line according to the present exemplary embodiment includes a negative pressure generation unit 110, a positive pressure generation unit 120, a pressure switching module 130, and a negative pressure test line 150.

When this configuration is compared with the configuration of the generally used conventional inkjet printer gas pressure controller shown in FIG. 2, it may be regarded as that the negative pressure test line 150 has been just added, but more specifically, there is a difference in the operation of the pressure switching module 130 as well, which will be described in detail later.

The negative pressure generation unit 110 is a component for applying negative pressure to a control target such as an ink storage unit. A method of applying the negative pressure to the control target may be performed by suctioning air from a control target-side, and a specific configuration for suctioning the air to apply the negative pressure is not limited thereto.

All intake technologies used not only in the field of inkjet printer gas pressure controller but also in other technical fields may be applied to an extent that the characteristics of the present disclosure are not impaired.

The positive pressure generation unit 120 is a component for applying positive pressure to the control target such as the ink storage unit. A method of applying the positive pressure to the control target may be performed by injecting air toward the control target, and a specific configuration of injecting the air in order to apply the positive pressure is not limited thereto.

All intake technologies used not only in the field of inkjet printer gas pressure controller but also in other technical fields may be applied to the extent the characteristics of the present disclosure are not impaired.

As described above, the most important functional matter in the inkjet printer gas pressure controller is to maintain a meniscus state with respect to ink located in an inkjet head. Since the negative pressure generation unit 110 for applying negative pressure is used in the process of maintaining the meniscus state, it may be considered that only the negative pressure generation unit 110 is required in the inkjet printer gas pressure controller.

However, the inkjet printer gas pressure controller does not always apply only negative pressure, and since a case of applying positive pressure occurs for various reasons, the positive pressure generation unit 120 is essentially included in the general inkjet printer gas pressure controllers.

For example, there may be cases in which positive pressure should be applied in order to manage an ink circulation system, positive pressure is applied for the purpose of completely removing ink from an inkjet head, and so on. As such, in a case of purging or draining ink for the purpose of maintenance and the like, the positive pressure is applied in an inkjet printer gas pressure controller.

The pressure switching module 130 is a component for controlling the operation of the inkjet printer gas pressure controller by connecting the negative pressure generation unit 110 or positive pressure generation unit 120 to the output tube 140 in which a flow of air for controlling a control target with negative or positive pressure in the inkjet printer gas pressure controller is output.

In this case, the pressure switching module 130 may also include a valve for controlling a connection relationship between the positive pressure generation unit 120 or negative pressure generation unit 110 and the output tube 140 and simultaneously controlling an intake amount or exhaust amount through the output tube 140. In addition, although not shown, a control unit for controlling the operation of the pressure switching module 130 may be installed, and in the pressure switching module 130, the control unit may control the valve for controlling the connection relationship between the positive pressure generation unit 120 or negative pressure generation unit 110 and the output tube 140 and for controlling the intake amount or exhaust amount through the output tube 140. Furthermore, the control unit may control the operations of the positive pressure generation unit 120 and the negative pressure generation unit 110.

As described above, the pressure switching module 130 is a component not only included in the inkjet printer gas pressure controller according to the present disclosure but also included in the conventionally used general inkjet printer gas pressure controller. Although main functions of the pressure switching module 130 for controlling the connection relationship between the positive pressure generation unit 120 or negative pressure generation unit 110 and the output tube 140 are the same, there is a difference in specific operation contents thereof, and in order to describe this difference, first, the operation of the pressure switching module 130 in the conventionally used general inkjet printer gas pressure controller will be described.

Figure 3:
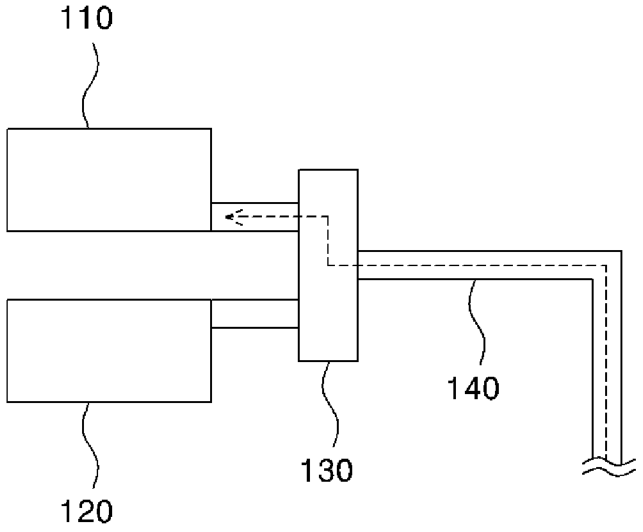
FIG. 3 is a view illustrating a case in which a pressure switching module connects an output tube and a negative pressure generation unit to each other in order to apply negative pressure to a control target in the generally used conventional inkjet printer gas pressure controller.
Figure 4:
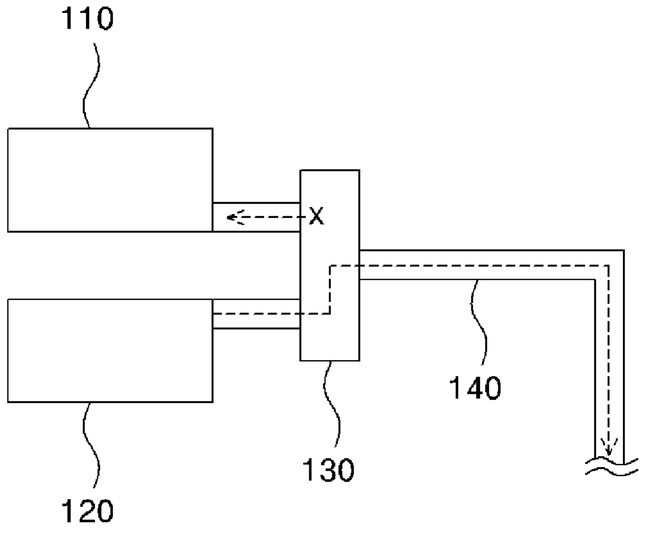
FIG. 4 is a view illustrating a case in which the pressure switching module connects the output tube and a positive pressure generation unit to each other in order to apply positive pressure to the control target in the generally used conventional inkjet printer gas pressure controller.

FIGS. 3 and 4 are views illustrating how the pressure switching module operates in the generally used conventional inkjet printer gas pressure controller.

FIG. 3 shows a case in which the output tube 140 and the negative pressure generation unit 110 are connected to each other in order to apply negative pressure to a control target, and FIG. 4 shows a case in which the output tube 140 and the positive pressure generation unit 120 are connected to each other in order to apply positive pressure to the control target.

As shown in FIG. 3, in the case where the pressure switching module 130 connects the output tube 140 and the negative pressure generation unit 110 to each other, gas is suctioned and flows to the negative pressure generation unit 110 through the output tube 140 along an arrow, whereby the negative pressure is applied to the control target such as the ink storage unit connected to the output tube 140.

As shown in FIG. 4, in the case where the pressure switching module 130 connects the output tube 140 and the positive pressure generation unit 120 to each other, gas is exhausted and flows from the positive pressure generation unit 120 through the output tube 140 along an arrow, whereby the positive pressure is applied to the control target such as the ink storage unit connected to the output tube 140.

According to these configurations, it may be seen that the pressure switching module used in the conventional general inkjet printer gas pressure controller operates almost the same as a general 3-way valve. In the case where the output tube 140 and the negative pressure generation unit 110 are connected to each other in order to apply negative pressure to the control target, the connection between the output tube 140 and the positive pressure generation unit 120 is disconnected, and in the case where the output tube 140 and the positive pressure generation unit 120 are connected to each other to apply positive pressure to the control target, the connection between the output tube 140 and the negative pressure generation unit 110 is disconnected.

In this case, when the positive pressure generation unit 120 and the output tube 140 are connected to each other, that is, when positive pressure is applied to the control target, the positive pressure generation unit 120 operates, and in this case, the positive pressure generation unit 120 may be configured to operate only when the positive pressure generation unit 120 and the output tube 140 are connected to each other. This is because there are few cases in which a predetermined positive pressure is required to be applied at a moment when the positive pressure generation unit 120 and the output tube 140 are connected to each other due to the nature of the situation where the positive pressure is applied to the control target. Accordingly, even though it takes a certain amount of time for the positive pressure generation unit 120 to operate and generate positive pressure of sufficient magnitude, it is sufficient that the positive pressure generation unit 120 operates only when the positive pressure generation unit 120 and the output tube 140 are connected to each other. Furthermore, the positive pressure generation unit 120 may also operate after the positive pressure generation unit 120 and the output tube 140 are connected to each other first.

Conversely, the negative pressure generation unit 110 is required to be operating from a time before the negative pressure generation unit 110 and the output tube 140 are connected to each other. The reason why negative pressure is applied to the ink storage unit, which is the control target, in the inkjet printer gas pressure controller is for the purpose of maintaining a meniscus state in the inkjet head, so as to enable precise inkjet printing. In this case, applying the negative pressure through the ink storage unit to the inkjet head connected thereto also serves to perform a function of preventing ink from leaking through the nozzle of the inkjet head. Although the nozzle of the inkjet head is very small, ink may leak little by little due to gravity, and in a case where the negative pressure generation unit 110 operates at the same time or immediately after the negative pressure generation unit 110 and the output tube 140 are connected to each other, there may occur a problem that the ink leaks to the nozzle due to a certain amount of time taken until the negative pressure generation unit 110 is able to apply the sufficient negative pressure. As a result, in consideration of the certain amount of time taken until the negative pressure generation unit 110 starts operating and the negative pressure generation unit 110 is able to apply the sufficient negative pressure, it is common that the negative pressure generation unit 110 continues to operate even in the case where the pressure switching module 130 connects the positive pressure generation unit 120 and the output tube 140 to each other. Naturally, when the time for applying positive pressure becomes longer, the operation of the negative pressure generation unit 110 may be stopped to save energy, but prior to the time to connect the negative pressure generation unit 110 and the output tube 140 to each other again, the pressure switching module 130 should make the negative pressure generation unit 110 to operate.

As a result, in the conventional inkjet printer gas pressure controller, during a predetermined time between immediately after the pressure switching module 130 connects the positive pressure generation unit 120 and the output tube 140 to each other and before the pressure switching module 130 disconnects the positive pressure generation unit 120 and the output tube 140 from each other, the negative pressure generation unit 110 that is not connected to the output tube 140 operates, thereby resulting in a state in which negative pressure is discarded.

In the present disclosure, in order to use the negative pressure discarded in the state in which the negative pressure generated in the process of operating the negative pressure generation unit 110 is discarded, the pressure switching module 130 connects the positive pressure generation unit 120 and the output tube 140 to each other and simultaneously connects the negative pressure generation unit 110 and the negative pressure test line 150 to each other.

Figure 5:
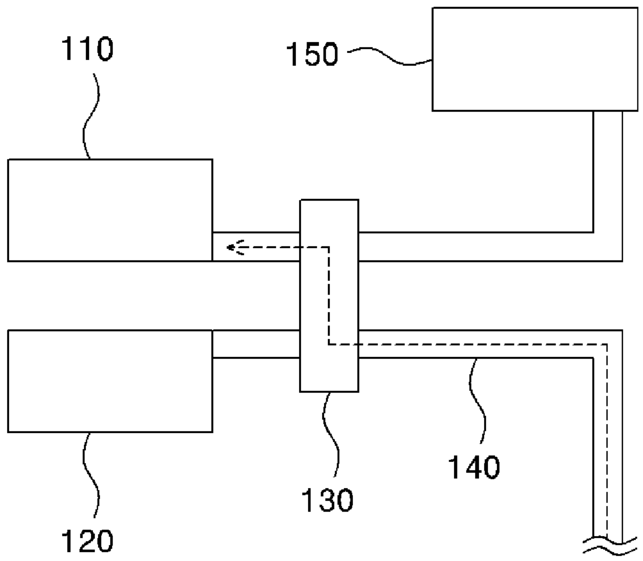
FIG. 5 is a view illustrating a case in which a pressure switching module connects an output tube and a negative pressure generation unit to each other to apply negative pressure to a control target in the inkjet printer gas pressure controller provided with the negative pressure test line according to the exemplary embodiment of the present disclosure.
Figure 6:
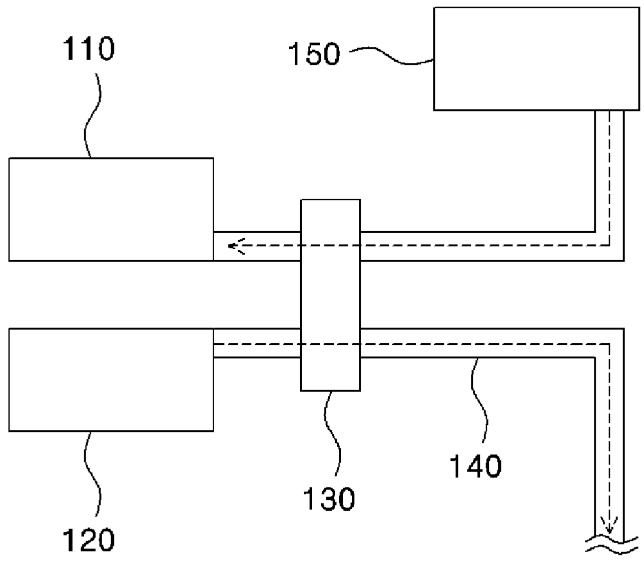
FIG. 6 is a view illustrating a case in which the pressure switching module connects the output tube and a positive pressure generation unit to each other to apply positive pressure to the control target in the inkjet printer gas pressure controller provided with the negative pressure test line according to the exemplary embodiment of the present disclosure.

FIGS. 5 and 6 are views illustrating how the pressure switching module operates in the inkjet printer gas pressure controller provided with the negative pressure test line according to the exemplary embodiment of the present disclosure.

FIG. 5 shows a case in which the output tube 140 and the negative pressure generation unit 110 are connected to each other in order to apply negative pressure to a control target, and FIG. 6 shows a case in which the output tube 140 and the positive pressure generation unit 120 are connected to each other in order to apply positive pressure to the control target.

As shown in FIG. 5, in the case where the pressure switching module 130 connects the output tube 140 and the negative pressure generation unit 110 to each other, gas is suctioned and flows to the negative pressure generation unit 110 through the output tube 140 along an arrow, whereby negative pressure is applied to the control target such as the ink storage unit and the like connected to the output tube 140.

As shown in FIG. 6, in the case where the pressure switching module 130 connects the output tube 140 and the positive pressure generation unit 120 to each other, the gas is exhausted and flows from the positive pressure generation unit 120 through the output tube 140 along an arrow, whereby positive pressure is applied to the control target such as the ink storage unit and the like connected to the output tube 140.

In this case, when the output tube 140 and the negative pressure generation unit 110 are connected to each other in FIG. 5, the state in which the positive pressure generation unit 120 and the output tube 140 are not connected to each other is the same as that of the generally used conventional inkjet printer gas pressure controller.

Whereas, in the case where the output tube 140 and the positive pressure generation unit 120 are connected to each other in FIG. 6, unlike the generally used conventional inkjet printer gas pressure controller where the negative pressure generation unit 110 and the output tube 140 are simply not connected to each other, the inkjet printer gas pressure controller provided with the negative pressure test line according to the present disclosure is characterized in that the pressure switching module 130 operates so that the negative pressure generation unit 110 disconnected from the output tube 140 is connected to the negative pressure test line 150.

Accordingly, in the case where the pressure switching module 130 connects the output tube 140 and the positive pressure generation unit 120 to each other as shown in FIG. 6, since the gas is exhausted and flows from the positive pressure generation unit 120 through the output tube 140 along an arrow so that positive pressure is applied to the control target such as the ink storage unit and the like connected to the output tube 140 and simultaneously the negative pressure generation unit 110 suctions gas of the negative pressure test line 150 along a corresponding arrow, the negative pressure of the negative pressure generation unit 110 becomes a state of being tested through the negative pressure test line 150.

Accordingly, the operation of the pressure switching module used in the inkjet printer gas pressure controller provided with the negative pressure test line according to the present disclosure has a difference from that of the general 3-way valve. In this regard, it may be seen that the operation of the general 3-way valve is performed between the negative pressure generation unit 110, output tube 140, and negative pressure test line 150 and the operation of a 2-way valve is performed between the positive pressure generator 120 and the output tube 140. Accordingly, a configuration may be made such that the 3-way valve is installed between the negative pressure generation unit 110, output tube 140, and negative pressure test line 150, the 2-way valve is installed between the positive pressure generation unit 120 and the output tube 140, and then the two valves interwork and operate together. Alternately, one new valve adapted to the operation of the above-described pressure switching module may be applied thereto.

In this case, as described above, due to the functional characteristics of the negative pressure generation unit 110, the negative pressure generation unit 110 is in a state of operating during the predetermined time between immediately after the pressure switching module 130 connects the positive pressure generation unit 120 and the output tube 140 to each other and before the pressure switching module 130 disconnects the positive pressure generation unit 120 and the output tube 140 from each other. Accordingly, during the predetermined time between immediately after the pressure switching module 130 connects the positive pressure generation unit 120 and the output tube 140 to each other and before the pressure switching module 130 disconnects the positive pressure generation unit 120 and the output tube 140 from each other, the negative pressure test may be performed through the negative pressure test line 150, whereby there exists a clear difference from operating the negative pressure generation unit regardless of the operation of the inkjet printer to inspect the negative pressure generation unit.

In addition, the present embodiment is preferable in terms of saving energy because of using the negative pressure, which has been discarded by the operation of the negative pressure generation unit 110 not connected to the output tube 140 during the predetermined time between immediately after the pressure switching module 130 connects the positive pressure generation unit 120 and the output tube 140 to each other and before the pressure switching module 130 disconnects the positive pressure generation unit 120 and the output tube 140 from each other in the conventional inkjet printer gas pressure controller.

Furthermore, the present embodiment may greatly improve the efficiency of the process using the inkjet printer compared to that of the related art in which the use of the inkjet printer had to be forcibly stopped to inspect the negative pressure generation unit 110.

Particularly, in the process of using the inkjet printer, the pressure switching module 130 performs a test on the negative pressure generation unit through the negative pressure test line 150 whenever the positive pressure generation unit 120 and the output tube 140 are connected to each other, whereby there is a great effect that whether an abnormality of the negative pressure generation unit 110 exists or not may be checked in advance or may be found at an early stage because the test on the negative pressure generation unit 110 is performed more frequently than in the conventional art.

The negative pressure test line 150 may be connected to the negative pressure generation unit 110 according to the operation of the pressure switching module 130, and may perform a test on the negative pressure generation unit 110.

A configuration of the negative pressure test line 150 for checking a state of the negative pressure generation unit 110 is not particularly limited, and any configurations capable of testing a failure and a state abnormality of the negative pressure generation unit may be applied within a range not impairing the characteristics of the present disclosure.

Figure 7:
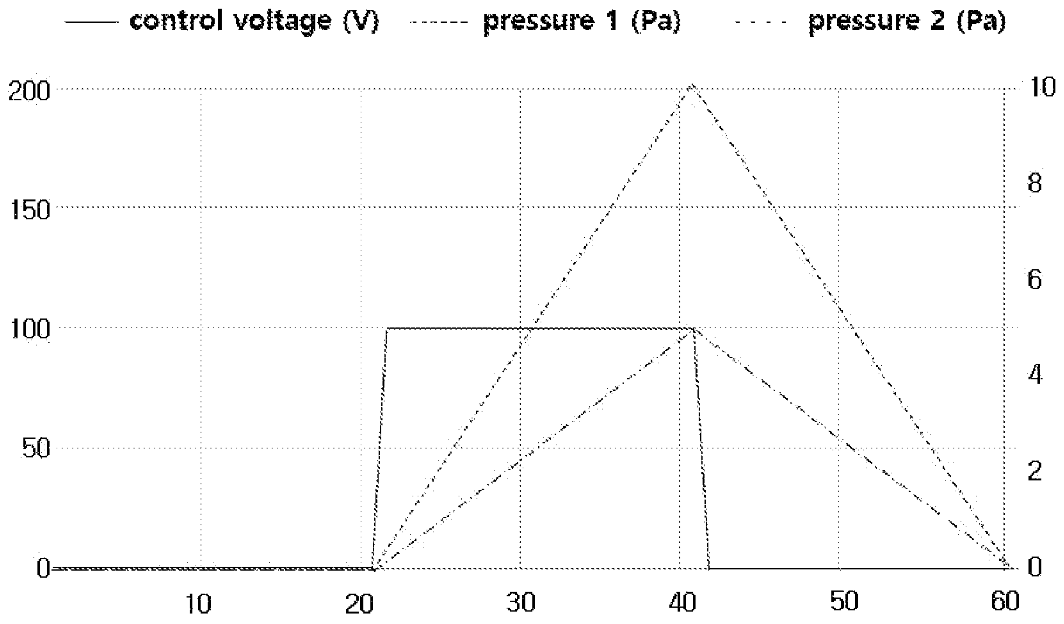
FIG. 7 is a graph illustrating an operation of the negative pressure test line in the inkjet printer gas pressure controller provided with the negative pressure test line according to the exemplary embodiment of the present disclosure.

FIG. 7 is a graph illustrating the operation of the negative pressure test line in the inkjet printer gas pressure controller provided with the negative pressure test line according to the exemplary embodiment of the present disclosure.

In FIG. 7, a blue line depicted in the graph represents a control voltage V, a red line depicted in the graph represents pressure Pa of negative pressure expected to be measured in the negative pressure test line in a case when the negative pressure generation unit operating normally is controlled by the control voltage in blue, and a yellow line depicted in the graph represents pressure Pa of the negative pressure actually measured in the negative pressure test line in a case when the negative pressure generation unit operating abnormally is controlled by the control voltage in blue.

According to such a graph, whether the negative pressure generation unit is operating normally or not may be checked by comparing the pressure of the negative pressure measured in the negative pressure test line on the basis of the voltage applied to the negative pressure generation unit.

Accordingly, as shown in FIG. 6, the pressure switching module 130 connects the negative pressure generation unit 110 and the negative pressure test line 150 to each other while connecting the positive pressure generation unit 120 and the output tube 140 to each other, so that the negative pressure test line 150 measures the negative pressure that is output from the negative pressure generation unit 110 through the output tube 140 and compares the measured negative pressure with normal negative pressure according to a corresponding voltage applied to the negative pressure generation unit 110, whereby whether the negative pressure generation unit operates normally or not may be evaluated. In this case, based on a difference between the normal negative pressure for the voltage applied to the negative pressure generation unit 110 and the negative pressure actually measured in the negative pressure test line 150, ranges including a normal range, an inspection-required range, and a failure range may be set. The case of the inspection-required range where accurate inspection should be performed again within a predetermined period, and the case of the failure range is a case where the inkjet printer should be stopped, inspected, and repaired.

The inkjet printer including the gas pressure controller provided with the negative pressure test line as described above includes: an inkjet head provided with a nozzle for discharging ink; an ink storage unit configured to store the ink to supply the ink to the inkjet head; and the gas pressure controller connected to the ink storage unit and configured to control internal pressure so that the ink stored in the ink storage unit maintains a meniscus state in the inkjet head, and may apply structures and techniques of various inkjet printers without limitation except for including the gas pressure controller provided with negative pressure test line having the above structure.

For example, a structure in which a gas pressure controller provided with one negative pressure test line is connected to one ink storage unit may be applied as that of the general inkjet printer. Alternately, in an inkjet printer provided with a plurality of ink storage units, an embodiment may apply a structure in which a gas pressure controller provided with a negative pressure test line is connected to each of the plurality of ink storage units or a gas pressure controller provided with one negative pressure test line is connected to at least some of ink storage units. Furthermore, an embodiment may apply a structure in which in addition to an ink storage unit, a component requiring gas pressure control is added and a gas pressure controller provided with a negative pressure test line is connected to the corresponding component.

As described above, the rest of the structure of the inkjet printer may be applied without limitation within the range not impairing the characteristics of the gas pressure controller provided with the negative pressure test line according to the present disclosure, so a detailed description thereof will be omitted.

In an inkjet printer including a gas pressure controller provided with a negative pressure test line according to another exemplary embodiment of the present disclosure, a pressure switching module for controlling a connection relationship between a negative pressure generation unit and a positive pressure generation unit in the gas pressure controller connects the negative pressure generation unit to the negative pressure test line when opening the positive pressure generation unit, whereby there is an effect that a negative pressure test may be performed whenever positive pressure is applied in the gas pressure controller of the inkjet printer.

In addition, since the negative pressure test may be performed whenever the gas pressure controller of the inkjet printer applies positive pressure, there is an effect that the negative pressure test may be performed in the middle of using the inkjet printer without interrupting the operation of the inkjet printer separately for the negative pressure test of the gas pressure controller.

Furthermore, there are great effects that not only there is no problem of increase in production cost incurred by the interruption of the operation of the inkjet printer because the operation of the inkjet printer is not interrupted separately for the negative pressure test of the gas pressure controller, but also damage caused by sudden failure of the gas pressure controller may be prevented by way of preventing the failure of the gas pressure controller in advance because the negative pressure test is frequently performed with a very short cycle compared to the lifespans of parts used in the gas pressure controller.

Figure 8:
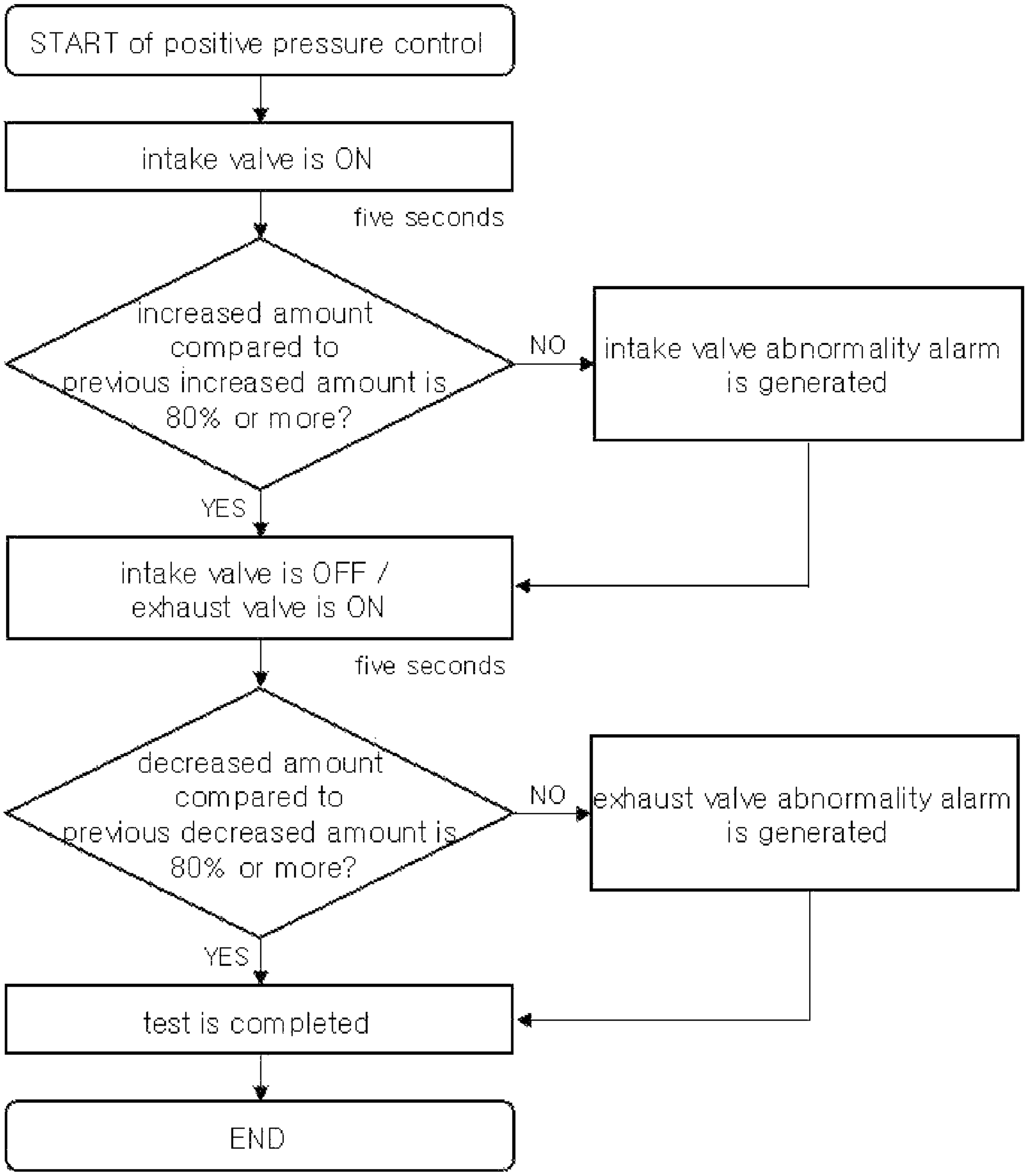
FIG. 8 is a flowchart illustrating a process of performing a negative pressure test on the inkjet printer gas pressure controller provided with the negative pressure test line according to the exemplary embodiment of the present disclosure.

FIG. 8 is a flowchart illustrating the process of performing a negative pressure test on the inkjet printer gas pressure controller provided with the negative pressure test line according to the exemplary embodiment of the present disclosure.

An intake valve for controlling intake air and an exhaust valve for controlling exhaust air are installed in the negative pressure generation unit of the inkjet printer gas pressure controller provided with the negative pressure test line according to the exemplary embodiment of the present disclosure. These intake and exhaust valves are the parts that most often fail in the negative pressure generation unit, and an inspection cycle of the negative pressure generation unit of the conventional inkjet printer gas pressure controller that is generally used is usually determined based on the lifespans of the intake and exhaust valves.

Meanwhile, unlike the conventional inkjet printer gas pressure controller that stops using the inkjet printer and performs a separate inspection on the gas pressure controller periodically, in the inkjet printer gas pressure controller provided with the negative pressure test line according to the exemplary embodiment of the present disclosure, the negative pressure test may be performed on the negative pressure generation unit by connecting the negative pressure generation unit and the negative pressure test line to each other when the pressure switching module connects the positive pressure generation unit and the output tube to each other in order to apply positive pressure to the gas pressure controller in the process of using the inkjet printer. Accordingly, the inspection on the intake and exhaust valves may be performed in a method different from the method of inspecting the negative pressure generation unit at intervals determined based on the lifespans of the intake and exhaust valves.

As shown in FIG. 8, in a case of starting positive pressure control in order to use positive pressure in the inkjet printer, the inkjet printer gas pressure controller provided with the negative pressure test line according to the exemplary embodiment of the present disclosure may perform the test on the intake and exhaust valves by connecting the positive pressure generation unit and the output tube to each other and by connecting the negative pressure generation unit and the negative pressure test line to each other.

First, an intake valve is operated in order to perform a test on the intake valve. In this case, while the intake valve is operating, a change in negative pressure applied to a negative pressure test line is checked, and in a case where an increased amount compared to a previous increased amount in the negative pressure is 80% or more, it is determined that the intake valve is operating normally and a next step is performed. Whereas, in a case where an increased amount compared to a previous increased amount in the negative pressure is less than 80%, it is determined that the intake valve is operating abnormally, whereby an abnormality alarm is generated for the intake valve, and the next step is performed. The abnormality alarm for the intake valve is not particularly limited, and may notify the abnormality in one or more ways such as sound, text, or color.

After performing the test on the intake valve, a test on the exhaust valve is performed as the next step. To this end, the intake valve stops operation thereof and the exhaust valve operates. In this case, while the exhaust valve is operating, a change in negative pressure applied to the negative pressure test line is checked, and in a case where a decreased amount compared to a previous decreased amount in the negative pressure is 80% or more, it is determined that the exhaust valve operates normally, and the test is terminated. Whereas, when a decreased amount compared to a previous decreased amount in the negative pressure is less than 80%, it is determined that the exhaust valve is operating abnormally, whereby an abnormality alarm is generated for the exhaust valve, and the next step is performed. The abnormality alarm for the exhaust valve is not particularly limited, may notify the abnormality in one or more ways such as sound, text, or color, and is preferably distinguished from the above-mentioned abnormality alarm for the intake valve.

Figure 9:
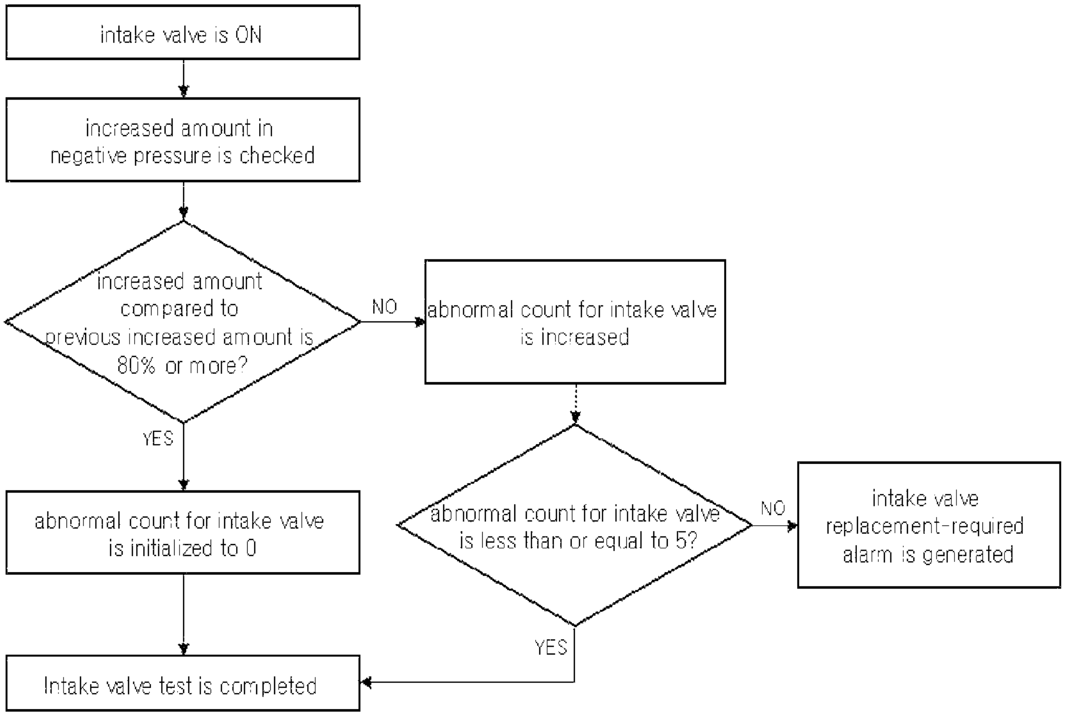
FIG. 9 is a flowchart illustrating a process of testing an intake valve included in the negative pressure generation unit for the inkjet printer provided with the negative pressure test line according to the exemplary embodiment of the present disclosure.

FIG. 9 is a flowchart illustrating the process of testing the intake valve included in the inkjet printer gas pressure controller provided with the negative pressure test line according to the exemplary embodiment of the present disclosure.

As described above, as for the test on the intake valve included in the negative pressure generation unit of the inkjet printer gas pressure controller provided with the negative pressure test line as shown in FIG. 9, in the case of starting positive pressure control in order to use positive pressure in the inkjet printer, the inkjet printer gas pressure controller provided with the negative pressure test line according to the exemplary embodiment of the present disclosure may perform the test on the intake valve by connecting the positive pressure generation unit and the output tube to each other and by connecting the negative pressure generation unit and the negative pressure test line to each other.

In this case, as shown in FIG. 8, it is common that the test on the intake valve is first performed after the negative pressure generation unit is connected to the negative pressure test line, but the test is not limited thereto, and the test on the exhaust valve may also be performed first before the test on the intake valve is performed.

First, an intake valve is operated in order to perform a test on the intake valve. In this case, while the intake valve is operating, a change in negative pressure applied to a negative pressure test line is checked, and when an increased amount compared to a previous increased amount in the negative pressure is 80% or more, it is determined that the intake valve is operating normally, and when an increased amount compared to a previous increased amount in the negative pressure is less than 80%, it is determined that the intake valve is operating abnormally, and an abnormal count for the intake valve is counted.

In the case where it is determined that the intake valve is operating normally, the abnormal count for the intake valve is initialized to 0, and the test on the intake valve is terminated.

Whereas, in the case where it is determined that the intake valve is operating abnormally, evaluation of changes in negative pressure is repeatedly performed, and in a case where the abnormal count indicating the abnormal operation of the intake valve is accumulated five times in succession, an intake valve replacement-required alarm is generated. The intake valve replacement-required alarm is not particularly limited, may notify the abnormality in one or more ways such as sound, text, or color, and preferably is configured to be distinguished from an exhaust valve replacement-required alarm. Conversely, in the case of the intake valve operating normally before the abnormal count indicating the abnormal operation of the intake valve is accumulated five times in succession, the abnormal count for the intake valve is initialized to 0, and the test on the intake valve is terminated.

Through such repetitive evaluation, the states of the intake valve may be more accurately evaluated, and whether to replace the intake valve or not may be quickly determined.

Figure 10:
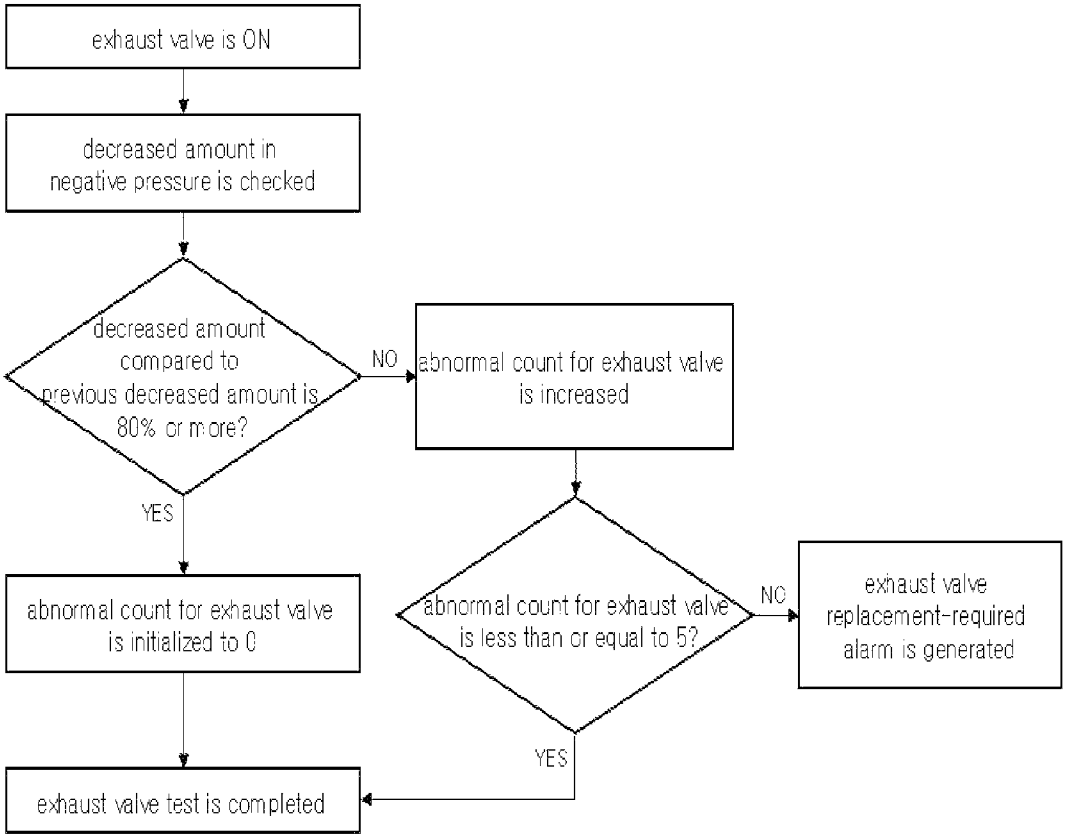
FIG. 10 is a flowchart illustrating a process of testing an exhaust valve included in the negative pressure generation unit for the inkjet printer provided with the negative pressure test line according to the exemplary embodiment of the present disclosure.

FIG. 10 is a flowchart illustrating the process of testing the exhaust valve included in the inkjet printer gas pressure controller provided with the negative pressure test line according to the exemplary embodiment of the present disclosure.

As described above, as for the test on the exhaust valve included in the negative pressure generation unit of the inkjet printer gas pressure controller provided with the negative pressure test line as shown in FIG. 10, in the case of starting positive pressure control in order to use positive pressure in the inkjet printer, the test on the exhaust valve may be performed by connecting the positive pressure generation unit and the output tube to each other and by connecting the negative pressure generation unit and the negative pressure test line to each other in the inkjet printer gas pressure controller provided with the negative pressure test line according to the exemplary embodiment of the present disclosure.

In this case, as shown in FIG. 8, it is common that the test on the intake valve is performed first before the test on the exhaust valve is performed, but the tests are not limited thereto. The test on the intake valve may be performed after the test on the exhaust valve is performed first, or only the test on the exhaust valve may be performed without performing the test on the intake valve.

First, an exhaust valve is operated in order to perform a test on the exhaust valve. In this case, while the exhaust valve is operating, a change in negative pressure applied to a negative pressure test line is checked. In a case where a decreased amount compared to a previous decreased amount in the negative pressure is 80% or more, it is determined that the exhaust valve is operating normally. In a case where a decreased amount compared to a previous decreased amount in the negative pressure is less than 80%, it is determined that the exhaust valve is operating abnormally, and thus an abnormal count for the exhaust valve is counted.

In the case where it is determined that the exhaust valve is operating normally, the abnormal count for the exhaust valve is initialized to 0, and the test on the exhaust valve is terminated.

Whereas, in the case where it is determined that the exhaust valve is operating abnormally, evaluation of changes in the negative pressure is repeatedly performed, and in the case where the abnormal count indicating the abnormal operation of the exhaust valve is accumulated five times in succession, an exhaust valve replacement-required alarm is generated. The exhaust valve replacement-required alarm is not particularly limited, may notify the abnormality in one or more ways such as sound, text, or color, and is preferably configured to be distinguished from the intake valve replacement-required alarm. Conversely, in the case where the exhaust valve operates normally before the abnormal count indicating the abnormal operation of the exhaust valve is accumulated five times in succession, the abnormal count for the exhaust valve is initialized to 0, and the test on the exhaust valve is terminated.

Through such repetitive evaluation, the states of the exhaust valve may be more accurately evaluated, and whether to replace the exhaust valve or not may be quickly determined.

The present disclosure has been described above through preferred exemplary embodiments, but the above-described exemplary embodiments are only illustrative of the technical idea of the present disclosure, and those skilled in the art will appreciate that various changes are possible without departing from the scope of the technical idea of the present disclosure. Therefore, the protection scope of the present disclosure should be construed by the matters described in the claims, not by the specific examples, and all technical ideas within the scope equivalent thereto should be construed as being included in the scope of the present disclosure.

What is claimed is:

1. An inkjet printer gas pressure controller provided with a negative pressure test line, the gas pressure controller controlling gas pressure in an inkjet printer and comprising:

a negative pressure generation unit capable of suctioning air and applying negative pressure through an output tube;

a positive pressure generation unit capable of exhausting the air and applying positive pressure through the output tube;

the negative pressure test line capable of testing the negative pressure generated by the negative pressure generation unit when connected to the negative pressure generation unit; and a pressure control module for controlling the negative pressure or positive pressure to be applied through the output tube by controlling a connection relationship between the negative pressure generation unit, the positive pressure generation unit, and the output tube, wherein the pressure control module operates to connect the negative pressure generation unit and the negative pressure test line to each other when connecting the positive pressure generation unit and the output tube to each other in order to apply the positive pressure through the output tube.

2. The gas pressure controller of claim 1, wherein the negative pressure generation unit operates for a predetermined time or more when the pressure control module connects the positive pressure generation unit and the output tube to each other in order to apply the positive pressure through the output tube, and the negative pressure generated by the negative pressure generation unit is tested in the negative pressure test line connected to the negative pressure generation unit.

3. The gas pressure controller of claim 1, wherein the negative pressure test line measures the negative pressure generated by the negative pressure generation unit and compares the measured negative pressure with normal negative pressure for a control voltage applied to the negative pressure generation unit during measurement.

4. An inkjet printer comprising a gas pressure controller provided with a negative pressure test line, the inkjet printer comprising:

an inkjet head provided with a nozzle for discharging ink;

an ink storage unit configured to store the ink to supply the ink to the inkjet head; and the gas pressure controller connected to the ink storage unit and configured to control internal pressure so that the ink stored in the ink storage unit maintains a meniscus state in the inkjet head, wherein the gas pressure controller comprises:

a negative pressure generation unit capable of suctioning air and applying negative pressure through an output tube;

a positive pressure generation unit capable of exhausting the air and applying positive pressure through the output tube;

the negative pressure test line capable of testing the negative pressure generated by the negative pressure generation unit when connected to the negative pressure generation unit; and a pressure control module for controlling the negative pressure or positive pressure to be applied through the output tube by controlling a connection relationship between the negative pressure generation unit, the positive pressure generation unit, and the output tube, and the pressure control module operates to connect the negative pressure generation unit and the negative pressure test line to each other when connecting the positive pressure generation unit and the output tube to each other in order to apply the positive pressure through the output tube.

5. The inkjet printer of claim 4, wherein the negative pressure generation unit operates for a predetermined time or more when the pressure control module connects the positive pressure generation unit and the output tube to each other in order to apply the positive pressure through the output tube, and the negative pressure generated by the negative pressure generation unit is tested in the negative pressure test line connected to the negative pressure generation unit.

6. The inkjet printer of claim 4, wherein the negative pressure test line measures the negative pressure generated by the negative pressure generation unit and compares the measured negative pressure with normal negative pressure for a control voltage applied to the negative pressure generation unit during measurement.

7. A method of testing negative pressure in an inkjet printer, the method comprising:

testing the negative pressure of a gas pressure controller in the inkjet printer comprising an inkjet head provided with a nozzle for discharging ink, an ink storage unit configured to store the ink to supply the ink to the inkjet head, and the gas pressure controller connected to the ink storage unit and configured to control internal pressure so that the ink stored in the ink storage unit maintains a meniscus state in the inkjet head, wherein the gas pressure controller comprises:

a negative pressure generation unit capable of suctioning air and applying the negative pressure through an output tube;

a positive pressure generation unit capable of exhausting the air and applying positive pressure through the output tube;

a negative pressure test line capable of testing the negative pressure generated by the negative pressure generation unit when connected to the negative pressure generation unit; and a pressure control module for controlling the negative pressure or positive pressure to be applied through the output tube by controlling a connection relationship between the negative pressure generation unit, the positive pressure generation unit, and the output tube, and the pressure control module operates to connect the negative pressure generation unit and the negative pressure test line to each other when connecting the positive pressure generation unit and the output tube to each other in order to apply the positive pressure through the output tube, and performs a negative pressure test through the negative pressure test line connected to the negative pressure generation unit in a state where the gas pressure controller applies the positive pressure to the ink storage unit in a process of using the inkjet printer.

8. The method of claim 7, wherein the negative pressure test line measures the negative pressure generated by the negative pressure generation unit and compares the measured negative pressure with normal negative pressure for a control voltage applied to the negative pressure generation unit during measurement.

9. The method of claim 7, wherein the negative pressure test line determines whether an intake valve operates normally or not by comparing an increased amount in the negative pressure in a state where an exhaust valve of the negative pressure generation unit is operated.

10. The method of claim 7, wherein the negative pressure test line determines whether an exhaust valve operates normally or not by comparing a decreased amount in the negative pressure in a state where an intake valve of the negative pressure generation unit is operated.

* * * * *